United States Patent [19]

Hopkins, Jr. et al.

[11] 4,071,482

[45] Jan. 31, 1978

[54] REDUCED-FRIABILITY, HIGHLY CROSS-LINKED, FLAME-RESISTANT, POLYURETHANE FOAMS

[75] Inventors: Henry S. Hopkins, Jr., Ashland; Donald L. Vargo, Columbus, both of Ohio

[73] Assignee: General Latex and Chemical Corporation, Cambridge, Mass.

[21] Appl. No.: 735,883

[22] Filed: Oct. 27, 1976

[51] Int. Cl.$^2$ .............................................. C08G 18/14
[52] U.S. Cl. .................. 260/2.5 AJ; 260/2.5 AL; 260/2.5 AQ; 260/2.5 AP; 260/2.5 AR
[58] Field of Search .................. 260/2.5 AJ, 2.5 AR, 260/2.5 AP, 2.5 AL, 2.5 AQ

[56] References Cited

U.S. PATENT DOCUMENTS

| | | | |
|---|---|---|---|
| 3,252,922 | 5/1966 | Degener et al. | 260/2.5 AP |
| 3,260,687 | 7/1966 | Postol | 260/2.5 AP |
| 3,317,638 | 5/1967 | Hartman et al. | 260/2.5 AR |
| 3,350,389 | 10/1967 | Patton, Jr. et al. | 260/2.5 AR |
| 3,359,217 | 12/1967 | Brandner | 260/2.5 AP |
| 3,412,048 | 11/1968 | Mercer et al. | 260/2.5 AR |
| 3,419,532 | 12/1968 | Jackson | 260/2.5 AP |
| 3,567,665 | 3/1971 | Carpenter et al. | 260/2.5 AP |
| 3,746,664 | 7/1973 | Doerge et al. | 260/2.5 AP |
| 3,746,692 | 7/1973 | Olstowski et al. | 260/2.5 AP |
| 3,751,392 | 8/1973 | Olstowski et al. | 260/2.5 AB |
| 3,847,844 | 11/1974 | Fuzesi et al. | 260/2.5 AJ |
| 3,878,156 | 4/1975 | Olstowski et al. | 260/30.4 N |

OTHER PUBLICATIONS

Journal of Organic Chemistry, vol. 25, pp. 1000–1012, 1960, Tsuzuki et al.

*Primary Examiner*—Eugene C. Rzucidlo
*Attorney, Agent, or Firm*—Richard P. Crowley

[57] ABSTRACT

Highly flame-resistant polyurethane foams of improved friability and reduced brittleness without a corresponding substantial increase in flame-spread or smoke-generation characteristics are prepared by incorporating into a foamable polyurethane composition an amount of a liquid organic carbonate, such as ethylene or propylene carbonate.

15 Claims, No Drawings

REDUCED-FRIABILITY, HIGHLY CROSS-LINKED, FLAME-RESISTANT, POLYURETHANE FOAMS

BACKGROUND OF THE INVENTION

Polyurethane foams, having ASTM E-84 flame spread of 75 or less, and in particular, 25 or less, have been prepared from special polyols, such as phosphorous-based, halogen-containing polyether and/or polyester polyols. The polymerization reaction has been carried out in bulk and in solution to provide essentially cross-linked brittle and friable foam products. The foam products are produced by combining the special polyols, an inert blowing agent, such as a low-boiling-point liquid like fluorocarbons, and one or more catalysts like a tertiary amine, and optionally a cell-control agent, and heating to effect the polyurethane reaction. The foams so produced to date have been poorly accepted, and have been characterized by high brittleness and high friability. Brittleness refers to the internal friability of the foam structure which remains essentially unchanged with time; that is, it is structural and molecular in nature, while friability refers to the state of the surface of the polyurethane foam; that is, the powderability of the surface when subject to pressure, which friability changes with time.

Attempts to reduce the friability of polyurethanes are made by modification of the polyurethane principally through the introduction of longer chemical linkages. This can be effected by the use of additional polyols which can be characterized as having low functionality (less than 3-4) and/or low hydroxyl content (hydroxyl number less than 400). This type of modification typically reduces overall physical properties and, more importantly, has an adverse effect on the flammability characteristics, such as smoke-generation properties. The best, present day, commercial products utilize nitrogen-based modifiers (so called amine-polyols) having typical hydroxyl number of 300-500 and functionality of 3-4.

It is desirable to prepare polyurethane foams which are capable of receiving ASTM E-84 flame-spread values of 25 or less and smoke-generation values with 4-inch foam samples of 400 or less. ASTM E-84 is commonly referred to as the "Steiner tunnel" or the tunnel test. Tunnel test values are made as comparisons to standardized values of 0 (zero) for asbestos cement-board and 100 for a particular grade of oak wood. The friability of polyurethane foams has severely limited the potential commercial success of this class of polyurethane foam products, because of the difficulty of processing the foam. A standard polyurethane foam polyol of hydroxyl number greater than about 500 typically produces a friable polyurethane foam with poor adhesion qualities, especially to unheated metal substrates. There are several techniques available to reduce the friability of such foam products, which techniques include the aforementioned reduction in hydroxyl content, increased catalyst concentration and the use of heated substrates. Plasticizers which are incorporated to reduce friability, such as organic plasticizers like phthalates; for example, dioctyl phthalate, often and typically significantly increase the flammability characteristics of the foam products to an unacceptable level of flame-spread values of more than 25, and high smoke-generation values. In addition such plasticizers degrade the physical properties of the foam, because of the high level use requirement necessary to produce a nonfriable foam product. Although the ASTM E-84 test procedure has not been shown to relate to actual fire conditions, it is used as a comparative value for polyurethane foam panels (and other building products) tested under similar fire conditions, and is one of the guides in judging the commercial acceptability of polyurethane foam under flame or fire conditions.

It is, therefore, most desirable to provide polyurethane foams which have low friability while retaining the other desirable properties of such foams, particularly with regard to low flame-spread values of less than 25 and low smoke generation, and methods of preparing such foams which provide for improved and rapid process conditions and cure of the polyurethane foam.

In the past, various modifiers have been employed in connection with rapid-setting, solid, dense, noncellular, polyurethane plastic compositions in order to modify the copies of such compositions, such as set forth, for example, in U.S. Pat. Nos. 3,883,466; 3,878,156; 3,878,157; and 3,886,102, and in different-type polyurethane foams for different purposes in U.S. Pat. Nos. 3,751,392 and 3,074,394.

Accordingly, the present invention is directed to the field of polyurethane foams of both improved friability and acceptable ASTM flame-spread properties, as well as foams which maintain high physical properties typical of highly cross-linked, rigid foams.

SUMMARY OF THE INVENTION

Our invention relates to a cross-linked polyurethane foam and to a method of preparing polyurethane foams of both improved friability and brittleness properties with low flame-spread values. Particularly, our invention relates to polyurethane foams of both improved friability and acceptable; for example, 25 or less, ASTM E-84 flame-spread value properties, and acceptable smoke-generation properties; for example, 400 or less. More particularly, our invention concerns polyurethane foams and the method of preparing such foams which contain a friability-modifying additive amount of a nonreactive liquid carbonate, such as ethylene or propylene carbonate.

Our invention relates to foamable polyisocyanate-polyol or prepolymer polyisocyanate-polyol which contains an amount of a liquid carbonate, such as an organic carbonate like a carbonate having a boiling point above about 230° C; for example, an alkylene carbonate like $C_2$–$C_6$ carbonate, such as ethylene, propylene or butylene carbonate, in an amount sufficient to reduce the friability or brittleness characteristics of the resulting foams to an acceptable level. The addition of the liquid, high-boiling-point, nonreactive carbonate permits unexpectedly both the reduction in friability and brittleness of the resulting polyurethane foam without a significant increase in flame-spread properties as measured by the tunnel test. In particular, the addition of ethylene or propylene carbonate, for example, at concentration levels of from about 1 to 10% or higher by weight of total ingredients, and particularly from about 2 to 8%, eliminates friability of the foam, foam brittleness and foam interface adhesion problems. Also importantly the use of the liquid carbonate additive permits a significant reduction in the preheat requirements during the processing of the foam from the foamable composition to the polyurethane foam-containing product. Particularly preferred levels of 3 to 6% of the liquid carbonate do not significantly alter the physical properties of the foam as tested through dry heat, hydrolytic and cold test conditions. It also has been found that no apparent leaching of the ethylene or propylene carbonate to the foam surface is observed, even after four weeks at 200° F aging conditions, while the use of other typical organic plasticizers show leaching to the foam surface by the plasticizer in such tests. These advantages are obtained without significant effects on the flame-spread values, so that our foam with such properties also has low and acceptable ASTM flame-spread values of 25 or less.

The base trimerization of isocyanates in the presence of catalytic amounts of ethylene carbonate has been reported to result in the acceleration of the trimerization process and in the formation of a solid complex of the polyisocyanurate-ethylene carbonate (see Tsuzuki et al, "New Reactions of Organic Isocyanates I. Reaction with Alkylene Carbonates", *Journal of Organic Chemistry*. Vol. 25, 1009, June 1960). Further, the chemical reaction of propylene carbonates with polyisocyanates is set forth in Saunders and Frisch, "Polyurethanes: Chemistry and Technology", *High Polymers*, Vol. XVI, Part 1, page 116, Interscience Publishing Co., Inc.

The unique and surprising effectiveness and multiple advantages of liquid alkylene carbonate in the production of our polyurethane foam over more commonly used plasticizers have been demonstrated in a number of experiments. A wide variety of liquid alkylene carbonates may be employed alone or in combination to obtain the benefits of our invention.

Studies as to friability-reduction ability of various modifiers in comparison to alkylene carbonates were made on the following classes of materials:

Liquid antioxidants;
High-Molecular-weight polyetherglycols;
Phosphate esters; and
Classic plasticizers (that is, dioctylphthalate).

The overall evaluation of the foam material performance was made by the following tests:

Friability reduction;
Primary cup shrinkage (immediate foaming);
Secondary shrinkage (2-24 hours after foaming); and
Heat, cold and hydrolytic aging of cut foam samples.

We have also found that the preferred alkylene carbonates provide for a polyurethane foam of low density of about 1.0 to 3.0; for example, 1.5 to 2.5 pounds per cubic foot, which has little initial friability, foam brittleness or shrinkage, and with dimensional stability equal to or better than conventional polyurethane foams. Our polyurethane foamable composition may include one-component, as well as two-component, one-shot, foamable compositions, which, on mixing the component parts, provide for the reaction of the components into a polyurethane foam product, either by its own heat exotherm or reaction, or, if desired, by the addition of external heat. One component may comprise an isocyanate compound, either aliphatic or aromatic, which term also includes isocyanate-terminated urethane prepolymers, as well as polyol and other modified prepolymers.

The second component of the composition comprises one or more catalysts; for example, catalysts from the group of amines, preferably tertiary amines, and/or organometals or organometallic salts, either alone or in combination, and typically in an amount of from about 0.02 to 3.0 percent by weight. In addition, the second component would include an expanding amount of an inert blowing agent, typically a liquid compound, such as a hydrocarbon or halohydrocarbon, which volatilizes during the reaction to produce a cellular structure. or a chemical blowing agent which decomposes by an in-situ generation of an inert gas. Typical inert blowing agents are exemplified by difluorodichloromethane and fluorotrichloromethane, but are not limited to these specific examples. It is also possible, and sometimes advantageous, to include water in the second component; for example, 0.05 to 0.5 weight percent, such as 0.1 to 0.3%, for the purpose of generating carbon dioxide gas as a blowing agent via the reaction with the organic isocyanate.

The second component would also include a surfactant or cell-control agent, such as a silicone product or a silicone-glycol ether copolymer, to aid in preparation of the foam and to control the cell size and structure of the resultant cellular product.

Other additives of the second component would include, but are not limited to, plasticizers such as various nonvolatile liquid esters, hydrocarbons, phosphate esters and the like, and other additives or modifying agents, such as flame and/or smoke-retardant additives, stabilizers, synergists, polyols, resins, fillers and the like.

A wide variety of organic isocyanates may be employed, such as, but not limited to, methylene bis phenyl isocyanate and its isomers and mixtures thereof, polymethylene polyphenyl polyisocyanate, meta or para phenylene diisocyanate, hexamethylene diisocyanate, toluene diisocyanate, diphenylmethane diisocyanate and the like.

The alkylene carbonates may be included in either of the two components, or may be added as a separate stream.

Polyols suitable for use in our improved formulations include those polyols having a hydroxyl number of about 300 to 600, and a functionality of three to eight. Typical polyols include polyols used in typical urethane products, as well as those polyols employed for flame-spread-rated urethanes, which polyols are the preferred polyols of the formulation.

Typical specific polyols include, but are not limited to, polyols having a hydroxyl number of approximately 370 and a functionality of 3 produced from the addition of trichlorobutylene oxide to a polyhydric initiator (which does not contain halogen or phosphorous); a phosphorous-based initiator which is brominated and then reacted with propylene oxide to form a polyol of approximate difunctionality and hydroxyl number of 350; and a phosphorous-based polyol having no halogen with a typical hydroxyl number of 300 and a functionality of 2-3.

Other polyhydric materials which have shown to be improved by the use of alkylene carbonate are the more typical urethane polyols, such as an amine-based, approximately trifunctional polyether polyol of 530 hydroxyl number typically; a sucrose-based polyether having functionality of 4-6 and a hydroxyl number of 460; and a sorbitol-based polyether of 6 functionality and a hydroxyl number of about 600.

These polyols fall into two distinct material types which represent polyols designed specifically for flame-spread-rated urethane foam systems, and which represent polyols designed for standard urethane foams. The foams produced have little or no friability, no brittleness, improved physical properties, reduced heat requirements during production cycles, etc. Alkylene carbonates make this improvement in a manner similar to other plasticizers, but with unexpected results of no loss of physical properties by the addition of such carbonates.

TYPICAL 'GENERIC' FORMULATION (FITTING BOTH MATERIAL GROUPS)

PART A
ORGANIC ISOCYANATE  1.0–1.15 NCO/OH

PART B
POLYOL  100 PARTS
300–600 HYDROXYL NUMBER
3–8 FUNCTIONALITY
SURFACTANT  1.0 PPHP(*)
CATALYST  0.005–2.0 PPHP
WATER  0.1–1.5 PERCENT(**)
FLUOROCARBON-11  10–50 PPHP
ALKYLENE CARBONATE  2–20 PPHP (*)PPHP — PARTS PER HUNDRED PARTS OF POLYOL
(**)PERCENT BY WEIGHT AS DETERMINED BY KARL FISHER TITRAMETRIC PROCEDURE

TABLE I
FORMULAE
ALL WEIGHTS ARE PERCENT BY WEIGHT OF TOTAL INGREDIENTS

| MATERIAL | F1 | F2 | F3 | F4 | F5 | F6 |
|---|---|---|---|---|---|---|
| ISOCY | 41.66 | * | * | * | * | * |
| RF-230 | 34.70 | * | * | * | * | * |
| LHT-240 | 5.15 | — | — | — | — | — |
| PPG-1025 | — | 5.15 | — | — | — | — |
| CP-4701 | — | — | 5.15 | — | — | — |
| FY-CEF | — | — | — | 5.15 | — | — |
| D O P | — | — | — | — | 5.15 | — |
| N 31.48 | — | — | — | — | — | 5.15 |
| RA-800 | 2.70 | * | * | * | * | * |
| R-595 | 0.30 | * | * | * | * | * |
| DC-193 | 0.76 | * | * | * | * | * |
| R 11-B | 14.73 | * | * | * | * | * |

* INDICATES SAME WEIGHT PERCENT AS FORMULA 1
— INDICATES MATERIAL NOT USED IN FORMULA

TABLE II
FORMULAE
ALL WEIGHTS ARE PERCENT BY WEIGHT OF TOTAL INGREDIENTS

| MATERIAL | F7 | F8 | F9 | F10 | F11 | F12 | F13 |
|---|---|---|---|---|---|---|---|
| ISOCY | 41.66 | * | * | * | * | * | * |
| RF-230 | 34.70 | * | * | * | * | * | * |
| SANT-141 | 5.15 | — | — | — | — | — | — |
| BEN-9-88 | — | 5.15 | — | — | — | — | — |
| PCO3 | — | — | 5.15 | — | — | — | — |
| CEL AC | — | — | — | 5.15 | — | — | — |
| C 22 R | — | — | — | — | 5.15 | — | — |
| DIBT | — | — | — | — | — | 5.15 | — |
| DIBA | — | — | — | — | — | — | 5.15 |
| RA-800 | 2.70 | * | * | * | * | * | * |
| R-595 | 0.30 | * | * | * | * | * | * |
| DC-193 | 0.76 | * | * | * | * | * | * |
| R 11-B | 14.73 | * | * | * | * | * | * |

* INDICATES SAME WEIGHT PERCENT AS FORMULA 7
— INDICATES MATERIAL NOT USED IN FORMULA

TABLE III
FRIABILITY RATINGS AND CUP SHRINKAGE

| INGREDIENT | FORMULA NUMBER | FRIABILITY | CUP SHRINKAGE |
|---|---|---|---|
| LHT-240 | 1 | 13 | 5 |
| PPG-1025 | 2 | 9 | — |
| CP-4701 | 3 | 8 | — |
| FYROL CEF | 4 | 6 | — |
| DIOCTYLPHTHALATE | 5 | 5 | 4 |
| NIAX 31-28 | 6 | 10 | — |
| SANTICIZER 141 | 7 | 12 | — |
| BENZOFLEX 9-88 | 8 | 11 | — |
| PROPYLENE CARBONATE | 9 | 1 | 1 |
| CELLOSOLVE ACETATE | 10 | 4 | — |
| PHOSGARD C 22-R | 11 | 7 | — |
| DIBUTYLPHTHALATE | 12 | 3 | 3 |
| DIISOBUTYLADIPATE | 13 | 2 | 2 |

FRIABILITY RATING FROM 1-13 WHERE 1="BEST" OR "LEAST" FRIABILITY CUP SHRINKAGE RATING FROM 1-5 WHERE 1=NONE, AND — IS SEVERE

TABLE IV
DIMENSIONAL STABILITY

| INGREDIENT | HUMID AGE | COLD AGE | HEAT AGE |
|---|---|---|---|
| DIOCTYLPHTHALATE | 4 | 3 | 3 |
| PROPYLENE CARBONATE | 1 | 1 | 1 |
| CELLOSOLVE ACETATE | 5 | 4 | 4 |
| DIBUTYLPHTHALATE | 3 | 2 | 5 |
| DIISOBUTYLADIPATE | 2 | 5 | 2 |

RATING IS FROM 1 - 5 WITH 1="BEST"

TABLE V ADDITIONAL DATA — COMPARISON OF VARIOUS MATERIALS IDENTIFICATION OF MATERIAL ABBREVIATIONS

The following materials were evaluated in these tests. Some of the materials were totally unusable for the reduction of friability/brittleness, while other materials are the typical ingredients of polyurethane foam systems.

| ABBREVIATION | IDENTIFICATION | -A- | -B- | -C- |
|---|---|---|---|---|
| DIBT | DIBUTYLPHTHALATE | ** | * | * |
| DIBA | DIISOBUTYLADIPATE | ** | ** | ** |
| BEN-9-88 | BENZOFLEX 9-88 (BENZOIC ACID ESTER OF POLYALKYLENE GLYCOLS) | — | — | — |
| IRGANOX 1093 | HI MOL. WT. HINDERED PHENOLIC ANTIOXIDANT | — | — | — |
| IRGANOX 1076 | " | — | — | — |
| IRGANOX 1035 | " | — | — | — |
| IRGANOX 1010 | " | — | — | — |
| CP4701 | 4500 MOL. WT. POLYETHER TRIOL (ETHYLENE OXIDE CAPPED POLYOL) | * | — | — |
| LHT-240 | 700 MOL. WT. POLYETHER TRIOL | * | — | — |
| FYROL CEF | TRIS BETA-CHLOROETHYL PHOSPHATE | * | — | — |
| PPG-1025 | 1000 MOL. WT. POLYETHER DIOL | * | — | — |
| N 31-48 | NIAX 31-48 STYRENE GRAFTED POLYETHER TRIOL | * | — | — |
| SANT-141 | SANTICIZER 141 MIXED PHOSPHATE ESTER | — | — | — |
| D O P | DIOCTYLPHTHALATE | ** | * | — |
| PCO3 | PROPYLENE CARBONATE | ** | ** | ** |
| CEL AC | CELLOSOLVE ACETATE | ** | * | — |
| C 22 R | PHOSPHOROUS-HALOGEN POLYESTER | * | — | — |
| — | WINGSTAY T (BUTYLATED OCTYL PHENOL) | — | — | — |
| — | WINGSTAY V (BUTYLATED STRYENATED CRESOL) | — | — | — |

| ABBREVIATION | IDENTIFICATION | -A- | -B- | -C- |
|---|---|---|---|---|
| — | PCP-0300 (TRIMETHYLOLPROPANE ADDUCT) | — | — | — |
| ISOCY | METHYLENE BIS-(PHENYL ISOCYANATE) [MDI] | NA | NA | NA |
| RF-230 | HALOGENATED POLYETHER POLYOL (OLIN CHEM.) | NA | NA | NA |
| RA-800 | 4 FUNCTIONAL AMINE-BASED POLYETHER (700 HN) | NA | NA | NA |
| R-595 | DABCO R-595 AMINE CATALYST (AIR PRODUCTS) | NA | NA | NA |
| DC-193 | DOW CORNING SILICONE GLYCOL COPOLYMER | NA | NA | NA |
| R 11-B | TRICHLOROFLUOROMETHANE BLOWING AGENT | NA | NA | NA |

It has been found that the preferred formulation of our invention comprises the combination of propylene carbonate; for example, 3 to 6%, with the chlorobutylene oxide polyol formulation F-9, and F-9 with about 0.1 to 0.3% by weight of water. The F-9 formulation has a unique combination of improved friability and low flame-spread (actual test values of 20 to 25) and smoke-generation properties (actual test value of 200 to 350 in 4-inch thick foam).

COLUMN NOTATION IDENTIFICATION

Column A — Friability Measurement (test comprises application of finger pressure on foam surface and evaluation of ease and depth of penetration into foam)
  * Slight friability improvement
  ** Significant friability improvement
  — No improvement
  NA Not applicable
Column B — Cup shrinkage measurement
  * Slight shrinkage
  ** No shrinkage
  — No improvement
  NA Not applicable
Column C — Dimensional stability rating
  * Average dimensional stability
  ** Very good dimensional stability
  — Poor dimensional stability
  NA Not applicable Although many materials did somewhat improve the friability properties, most were eliminated due to severe cup shrinkage or dimensional instability, which would render the foam unacceptable. Other experiments showed effective results only at very high additive levels of 8 to 20% by weight of some materials, which was judged not practical due to diminution in foam properties and increase in flame-spread values. Levels of 2 to 10% were found to be effective for the alkylene carbonate in particular, and others in general. Other tests indicate further that unstable (chemically) liquid systems result with many of the studied chemical additives, except the alkylene carbonates.

We have found in our polyurethane foams the presence of the liquid carbonate, such as ethylene or propylene carbonate, at the preferred levels which does not significantly change the flammability characteristics of the foam as measured by commonly applied laboratory test methods, while, on the other hand, organic plasticizers are often employed to decrease friability of such foams and significantly increase the flammability character of the foam because of the high use level of plasticizer necessary to produce a good nonfriable foam product.

These improved flammability characteristics are especially noted in tests of smoke development or smoke generation. A laboratory test comparison of relative smoke generation was developed to rate the various materials appearing in the list (Table V). It was found that all materials, with the exception of propylene, carbonate, increased the relative smoke generation of the resultant polyurethane foam. Correlation to existant ASTM or National Bureau of Standards test methods is not good, but ASTM E-84 smoke generation on formula number 9 showed values under 400; for example, 200 to 325, in 4-inch-thick core foam samples, while values of greater than 1000 smoke generation have been obtained for foams with common plasticizers, such as dioctylphthalate.

Our foams are usefully employed as structural foam products, such as foam panels used in the housing and construction and furniture fields, and have been employed and adhere satisfactorily to sheet supporting substrates, such as metal panels and sheetings, particularly with adhesives or by casting in place and heating.

Results of testing under ASTM E-84 procedures are reported as flame spread, fuel contribution and smoke generation. Only of commercial importance currently are flame-spread and smoke-generation properties. For typical urethane foams (not treated), flame spreads are estimated to be above 1000, with smoke generation easily over 1000. The values are estimates, since the test is not designed to give reproducible results when flame spreads and smokes are over about 500. Treating foams by the inclusion of typical flame-spread polyols without alkylene carbonates gives typical values of 15 to 40 for flame spreads, and smoke-generation values that are 400 and above. It is also important to note that these values are obtained when foam samples tested are 4 inches in thickness, since thickness directly affects smoke generation.

We have found that the inclusion of all of the present commercial nonreactive additives (plasticizers) to decrease flame spread will typically increase often drastically the smoke generation. This is also the case when plasticizers, such as dioctyl phthalate, are included.

The inclusion of alkylene carbonate (typically propylene carbonate) was very unexpectedly found to have no effect on smoke generation, and, in some cases not understood, actually reduces the smoke generation without affecting the flame-spread value. Many laboratory tests can be used to gage the flame spread and smoke generation, but none can be correlated directly to ASTM E-84 results.

Our invention has been described and set forth for the purpose of illustration only in connection with the foregoing example; however, it is recognized and is a part of our invention that various substitutions and modifications can be made in the formulations and techniques by one skilled in the art without departing from the spirit and scope of our invention.

What we claim is:

1. An improved, rigid, cross-linked, polyurethane foam characterized by ASTM E-84 flame-spread values of 25 or less and low smoke-generation values of 400 or less, and having improved friability properties, which foam comprises the reaction product of a polyisocyanate and a halogenated polyether polyol having a hydroxyl number of about 300 to 600 and a functionality of three to eight, the reaction carried out in the presence of a catalyst and a blowing agent, and which foam contains from about 1 to 10% by weight of a liquid $C_2$–$C_6$ alkylene carbonate having a boiling point of greater than about 230° C.

2. The polyurethane foam of claim 1 which is characterized by a flame-spread value of about 20 to 25 and a smoke-generation value of a 4-inch foam of between about 200 and 400.

3. The polyurethane foam of claim 1 wherein the liquid carbonate is ethylene carbonate or propylene carbonate and mixtures thereof.

4. The polyurethane foam of claim 1 wherein the carbonate is propylene or ethylene carbonate and is present in an amount of from 2 to 8% by weight.

5. The polyurethane foam of claim 1 wherein the polyol is a chloro or bromo butylated polyol.

6. The polyurethane foam of claim 1 wherein the halogenated polyether polyol is a chlorobutylene oxide polyol.

7. The polyurethane foam of claim 1 wherein the blowing agent is a liquid fluorocarbon blowing agent.

8. The polyurethane foam of claim 1 which has a density of from about 1.0 to 3.0 pounds per cubic foot.

9. The polyurethane foam of claim 1 wherein the polyol contains from about 0.1 to 1.5% by weight of water.

10. An improved, rigid, cross-linked, polyurethane foam characterized by ASTM E-84 flame-spread values of about 20 to 25 or less and low smoke-generation values of a 4-inch foam of between 200 and 400 or less, and having improved friability properties, which foam comprises the reaction product of a polyisocyanate and a polyol comprising a chloro polyether polyol, and having a hydroxyl number of about 300 to 600 and a functionality of three to eight, the reaction carried out in the presence of a catalyst and a blowing agent, and which foam contains from about 2 to 8% by weight of a propylene carbonate.

11. The polyurethane foam of claim 10 wherein the polyol is a trichlorobutylene oxide polyol.

12. The polyurethane foam of claim 11 which has a density of from about 1.0 to 3.0 pounds per cubic foot.

13. A method of preparing an improved polyurethane foam which is characterized by ASTM E-84 flame-spread values of 25 or less and low smoke-generation values of 400 or less, and having improved friability properties, which method comprises reacting a polyisocyanate and a halogenated polyether polyol having a hydroxyl number of about 300 to 600 and a functionality of three to eight, the reaction carried out in the presence of a catalyst and a blowing agent, and which foam contains from about 1 to 10% by weight of ethylene or propylene carbonate.

14. The method of claim 13 wherein the polyol is a chlorobutylene oxide polyol.

15. The method of claim 14 wherein the polyol contains from about 0.1 to 1.5% by weight of water.

* * * * *